(12) United States Patent
Acharya et al.

(10) Patent No.: US 10,331,119 B2
(45) Date of Patent: Jun. 25, 2019

(54) INDUSTRIAL EQUIPMENT INSTALLATION

(71) Applicant: ABB Schweiz AG, Baden (CH)

(72) Inventors: Mithun P. Acharya, Cary, NC (US);
Benjamin Kloepper, Mannheim (DE);
Jeffrey Harding, Holly Springs, NC (US); Thomas Goldschmidt,
Karlsdorf-Neuthard, Baden-Württemberg (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/665,365

(22) Filed: Jul. 31, 2017

(65) Prior Publication Data

US 2019/0033844 A1    Jan. 31, 2019

(51) Int. Cl.
| | |
|---|---|
| G05B 19/418 | (2006.01) |
| G05B 23/02 | (2006.01) |
| G07C 3/14 | (2006.01) |
| G06F 11/34 | (2006.01) |
| G06K 19/067 | (2006.01) |
| B60R 25/04 | (2013.01) |

(52) U.S. Cl.
CPC ...... G05B 23/0289 (2013.01); G06F 11/3495 (2013.01); G07C 3/143 (2013.01); B60R 25/04 (2013.01); G06K 19/0672 (2013.01)

(58) Field of Classification Search
None
See application file for complete search history.

(56) References Cited

U.S. PATENT DOCUMENTS

| | | | |
|---|---|---|---|
| 6,477,667 B1 | 11/2002 | Levi et al. | |
| 6,636,983 B1 | 10/2003 | Levi | |
| 6,833,787 B1 | 12/2004 | Levi | |
| 7,349,964 B2 * | 3/2008 | Motoyama | G06Q 30/02 709/203 |
| 7,552,029 B2 | 6/2009 | Elwood et al. | |
| 8,676,957 B2 * | 3/2014 | Motoyama | H04L 43/067 709/208 |
| 9,463,574 B2 * | 10/2016 | Purkayastha | B25J 9/1697 |
| 2016/0342151 A1 * | 11/2016 | Dey, IV | B25D 16/00 |

* cited by examiner

*Primary Examiner* — K. Wong
(74) *Attorney, Agent, or Firm* — Taft Stettinius & Hollister LLP; J. Bruce Schelkopf

(57) ABSTRACT

A system and method for monitoring operating conditions of an industrial installation system including a plurality of pieces of equipment. Each of the pieces of equipment includes a sensor and an electrically identifiable tag configured to identify the equipment. The sensors of each of the plurality of pieces of equipment provide an operating characteristic of the piece of equipment that is provided to an industrial equipment management system. The system is also configured to store the content of the electrically identifiable tag and to store a location identifier of each of plurality of pieces of equipment. Replacement of the identified defective equipment is made with replacement equipment having an identifier that uniquely identifies the replacement device and the location of the replacement device in the industrial installation system.

18 Claims, 3 Drawing Sheets

INDUSTRIAL EQUIPMENT INSTALLATION

TECHNICAL FIELD

The present disclosure relates to an industrial system installation including installed equipment, and more particularly to the replacement of a defective piece of equipment with a replacement piece of equipment.

BACKGROUND

Industrial system installations take many forms and include a wide variety of pieces of equipment or devices, depending on the type of industrial system. Many different types of industrial systems, however, share common equipment such as pumps, motors, turbines, communication systems, and computing systems. These systems are quite complex and include not only the same types of equipment, but also share the similar types of fault conditions and equipment failures. Some industrial systems include one or more smaller installations that operate in conjunction with other smaller installations to complete the larger system. Many industrial system installations, therefore, include fault detection systems to protect the equipment from complete failure as well as to protect the system from reduced operability or complete shutdown. Industrial systems are not limited to a fixed location and can be moved from location to location. In addition, the operating system of vehicles, for instance a locomotive or engine of a rail transport vehicle, can be considered as an industrial system.

As the industrial system ages, the condition and the performance of the equipment degrades over time due to wear and tear from use. These conditions have a negative impact to the system's output and can raise the cost of production. In many industrial systems, the location of the equipment extends over a large expanse of floor space or real estate. The operating conditions of the equipment are consequently monitored to anticipate equipment failure and to counter the impact of system downtime.

Some industrial system installations include relatively complex control and communication systems which can be a locally maintained system or which can be a "cloud" based system to store data regarding the operating conditions of individual pieces of technical equipment as well as the overall operating condition of the industrial system.

Replacement of equipment within an industrial system can be an often occurring activity. The replacement of equipment or installations, however, requires replacing the defective device with an appropriate replacement device. Since many of these industrial systems are highly complex, including being spread over a large expanse of floor space or real estate, data records are maintained for the equipment. The maintenance of these records, however, is very time consuming and can be prone to error. Under some circumstances, an inconsistent representation of the equipment in the information system results in a poor system performance. If the inconsistent representation is not identified early enough, larger, more expensive efforts to fix data quality problems must be completed. Therefore, there is a significant need for the unique apparatuses, methods, systems and techniques disclosed herein.

SUMMARY

Exemplary embodiments include unique systems, methods, techniques and apparatuses for monitoring the operating condition of an industrial installation system having a plurality of pieces of equipment, devices, installations, and components. Further embodiments, forms, objects, features, advantages, aspects and benefits of the disclosure shall become apparent from the following description and drawings.

In one embodiment, there is provided a method of monitoring operating conditions of an industrial installation system including a plurality of devices. The method includes: monitoring one of the plurality of devices with a sensor configured to determine an operating state of the monitored device; identifying the monitored device as a defective device needing replacement; determining identity information of the defective device; determining identity information of a replacement device; storing the determined identity information of the replacement device in a memory; determining location information of the defective device; and associating the determined location information of the defective device with the replacement device in a memory device.

In another embodiment, there is provided an industrial equipment system including a plurality of devices, wherein each device includes an electrically identifiable tag having information to uniquely identify the device with which the tag is associated. A microprocessor-based industrial equipment management system is in operative communication with the plurality of devices. Each of the plurality of devices is located remotely from the industrial equipment management system, wherein the microprocessor-based industrial equipment management system includes a controller and a memory configured to store program instructions. The controller is configured to execute the stored program instructions to: monitor an operating state of each of the plurality of devices; determine identity information of a defective device of one of the plurality of devices; determine identity information of a replacement device adapted to replace the defective one of the plurality of devices; store the identity information of the replacement device in the memory; electronically reading location information of the defective device; and associate the location information of the defective device with the replacement device in the memory.

In still another embodiment there is provided an industrial equipment system including a plurality of devices wherein each device includes an electrically identifiable tag having information to uniquely identify each of the plurality of devices and a sensor adapted to provide an operating state of the device. A reader is adapted to determine the content of the electrically identifiable tag. A transmitter is adapted to transmit the determined content of the electrically identifiable tag. A microprocessor-based industrial equipment management system is in operative communication with the sensors of each of the plurality of devices and with the transmitter, wherein each of the plurality of devices is located remotely from the industrial equipment management system. The microprocessor-based industrial equipment management system includes a controller and a memory operatively connected to the controller and is configured to store the content of the electrically identifiable tag and to store a location identifier of each of plurality of devices.

DETAILED DESCRIPTION OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. In addition, while industrial systems include many different types and kinds of pieces of equipment, devices, components, and installation, these terms are used interchangeably herein unless otherwise noted. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

Figure 1:
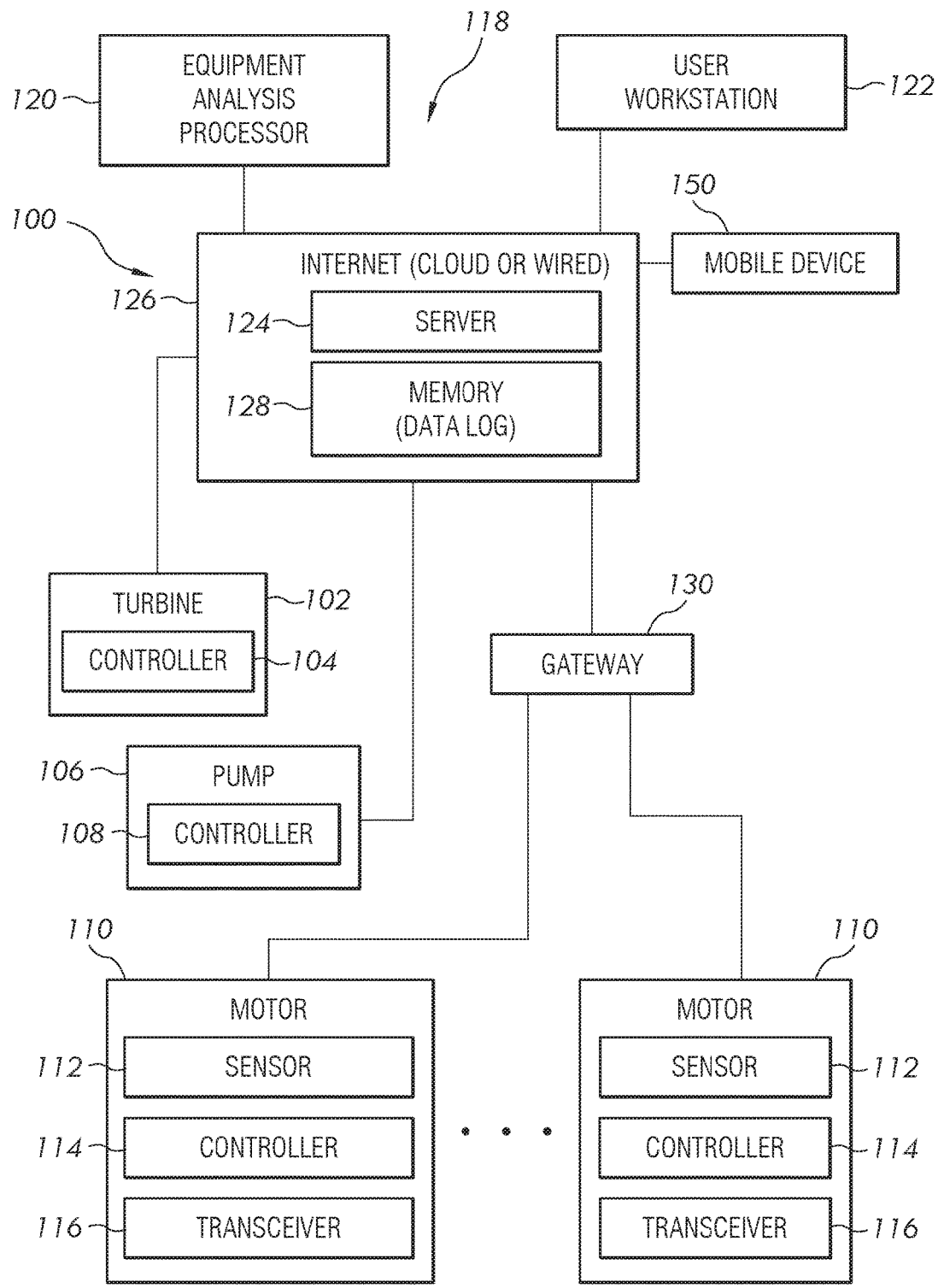
FIG. 1 illustrates a schematic block diagram of one embodiment of an industrial system installation having a plurality of different devices.

FIG. 1 illustrates a schematic block diagram of an industrial system installation 100 of the present invention. The industrial system installation 100 can be located in different locations and is configured to provide technology solutions in utility systems, industrial systems, transportation systems, and infrastructure systems. FIG. 1, consequently, is representative one type of system, an industrial system, but is not intended to limit the scope of the present disclosure.

FIG. 1 includes a plurality of devices found in the industrial system installation 100 including a turbine 102 having a controller 104, a pump 106 having a controller 108, and a plurality of motors 110. Each of the motors 110 includes, in one embodiment, a sensor 112, a controller 114, and a transceiver 116. Each of the turbine 102, the pump 106, and the motors 110 are operatively connected to an asset management system 118 which includes an equipment analysis processor 120 and a user workstation 122, each of which communicates with a server 124 accessible through an internet 126 or other communication system.

In different embodiments, communication with the server 124 made by hardwiring when the server 124 is located within or near a facility in which the equipment is located. In other embodiments, communication to the server 124 is made available through the "cloud". In a cloud based server, the "cloud" is generally defined as storing and accessing data and programs over the Internet instead of, or in combination with, using a computer's hard drive or memory located at a facility at which the devices are located or elsewhere. A memory 128 is operatively connected to the server 124 and is used to store software code including program instructions as well as data, such as a data log. The memory 128, in different embodiments, is either an internal memory located within the server 124 is an external memory located outside the server.

Each of the motors 110 is coupled to a gateway 130, which is configured as a wireless communication gateway, which provides operating conditions of each of the motors 110 to the server 124, to which the gateway 130 is operatively coupled. The controller 114 of each motor includes a processor and a memory. The processor, in different embodiments, is a programmable type, a dedicated type, a hardwired state machine, or a combination of these, and can further include multiple processors, Arithmetic-Logic Units (ALUs), Central Processing Units (CPUs), Digital Signal Processors (DSPs) or the like. Other forms of processor include multiple processing units, distributed, pipelined, and/or parallel processing. In the illustrated embodiment, the processor is a programmable variety that executes algorithms and processes data in accordance with defined by programmed instructions (such as software or firmware) stored in a memory. The operating logic for the processor, in different embodiments, is at least partially defined by hardwired logic or other hardware.

The memory includes one or more types, such as a solid-state variety, electromagnetic variety, optical variety, or a combination of these forms. Furthermore, the memory includes, in different embodiments, volatile, nonvolatile, or a combination of these types, and a portable variety, such as a disk, tape, memory stick, cartridge, or the like. The memory is configured to store data that is manipulated by the operating logic utilized by the server 124, such as data representative of signals received from and/or sent to the equipment in addition to or in lieu of stored program instructions, just to name one example.

The sensor 112 of each of the motors 110 monitors one or more operating conditions of the motor 110. In different embodiments, the sensor 112 is a single sensor or includes multiple sensors, each providing one or more monitored operating conditions. Operating conditions include, but are not limited to, motor vibration, current consumed by the motor, temperature of the motor, and the frequency of operation of the motor. The sensor 112 provides a signal representative of the particular operating condition, which is processed by the controller 114 and is either stored in memory for later access, or is manipulated to an appropriate format for sending to the gateway 130 through a transceiver 116. The operating conditions of each of the motors 110 are subsequently transmitted by the gateway 130 to the server 124 are stored in the data log of the memory 128. Other locations of the data log are contemplated.

The equipment analysis processor 120 determines the content of the transmitted data and provides an analysis of the data to determine whether the observed conditions of the motor indicate any performance issues such as a motor breakdown or a possibility of a motor breakdown. The equipment analysis processor 120 manipulates the raw data provided by the sensors and determines whether the raw data indicates a problem with the motor. For instance, the raw vibration data is analyzed over a period to time to determine whether or not the motor is beginning to fail. If the analyzed data indicates that the motor is entering a failure mode, the motor is identified as being a defective motor that requires replacement.

The equipment analysis processor 120, in one or more embodiments, also provides processed current operating conditions to the user workstation 122 through the server 124. The current operating conditions are displayed at the workstation 122 in a format that draws attention to important operating conditions for an operator or user using the workstation 122.

The asset management system 118 stores data generated by equipment, devices, technical components, or installations within industrial installation system. Each piece of equipment, in one or more embodiments, is located within the industrial system and is identified by a unique identifier and a location. This information is stored, for instance, in the data log found in the memory 128 or at another memory accessible in the asset management system 118. This data is matched with the operating characteristics of the appropriate equipment, so that each piece of equipment can be individually monitored.

Replacement of the equipment within the industrial system is an often occurring activity, however, and requires diligent and continued effort to accurately maintain an accurate record, or information model, of the equipment. In order to insure that the data representation within the cloud system or at another location is consistent with the physical reality of the system, the representation needs to be updated on a regular basis. In the known current systems, the updating of the information model is detached from the physical process of replacing parts and elements in the industrial systems. Due to this detachment, the update process is prone to error. One consequence is that any equipment monitoring applications can be inaccurate and perform poorly due to an inconsistent representation in the information model. Additionally, if the data is inaccurate and not regularly corrected, larger and expensive efforts to fix data quality problems result.

What is needed therefore is a process of replacing a piece of equipment, which is closely linked to the process of updating the information model in the information process. In this way, human errors are reduced or avoided and a better data quality is achieved.

Figure 2:
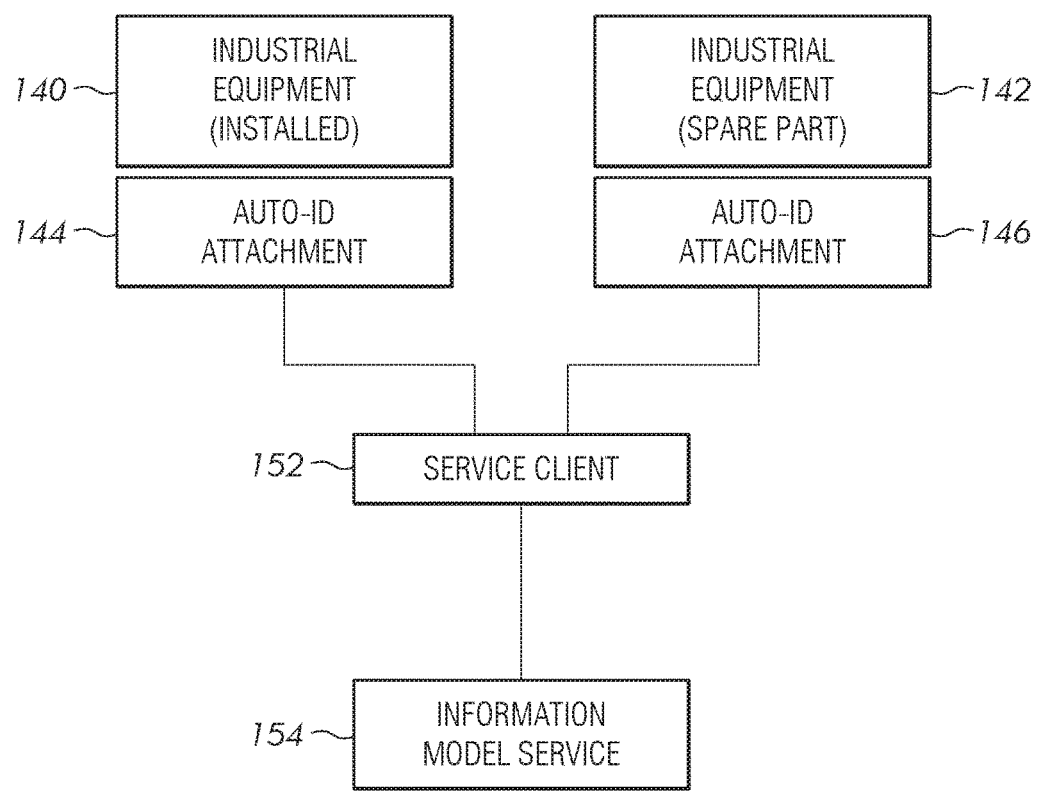
FIG. 2 illustrates a schematic block diagram of industrial equipment having an identifier configured to interface with a service client.

As further illustrated in FIG. 2, a schematic block diagram of an equipment monitoring and replacement system is disclosed. Each piece of equipment, including an installed piece of equipment 140 and a replacement piece of equipment 142, or spare part, is identified with a unique identifier that identifies the piece of equipment by, for instance, a unique serial number, a unique part number, or other unique identifier. The installed piece of equipment 140 includes an automatically identifiable attachment 144 having the unique identifier. The unique identifier of the attachment 144 in different embodiments includes, but is not limited to, a quick response (QR) Code, a near field communication (NFC) code, a bar code, or a machine-readable name-plate. Any type of identifier, which is machine readable, or electronically readable, is contemplated. The replacement piece of equipment 142 includes an automatically identifiable attachment 146, similarly configured as the attachment 144, but distinguishable therefrom to distinctly identify the piece of replacement equipment. In one embodiment, the attachment is a component which is separable from the piece of equipment and which is fixedly attached to the piece of equipment. In other embodiments, the attachment 144 is not a separate attachment, but is instead an identifier which is formed as part of the piece of equipment during manufacture.

Each of the identifiers is capable of being read by a machine or device adapted to read the identity of the piece of equipment. In one embodiment, the identifier is read by a communication device 150 (see FIG. 1) which is operatively connected to the internet 126, as would be understood by those skilled in the art. In different embodiments, the communication device 150 includes a reader, but is not limited to, a mobile device, a smart phone, a cell phone, a mobile phone, a tablet device, a desktop computer, a laptop computer, or other communication device configured to communicate with the internet server 124. A mobile device provides certain advantages since the device can be moved from location to location within a facility and still communicate with the server 124 through the cloud.

The communication device 150 supports the use of a service client 152, also known as a software application, or "app", which communicates with the server 124. The service client 152 is a stand-alone software application that runs on the communication device 150. The applications described herein can be embodied as program code in software and/or firmware resident in one or communication devices 150. In other embodiments, the applications are located on the cloud server 124, at the equipment analysis processor 120, or the user workstation 122, and are accessed by the communication device 150. The communication device 150, in different embodiments, includes application programming interfaces (APIs). The communication device provides for bi-directional communication over communication protocols including Bluetooth, Wi-Fi, NFC, Ethernet, and/or 3G communication networks or 4G communication networks.

In one exemplary embodiment, one or more of the motors 110 are installed in the industrial system 110. At some point, an installed motor is replaced with a replacement motor. The service client 152, for instance located on the mobile phone, uses the automatic identification feature of the service client 152 to identify both the installed motor and the replacement motor. The service client 152 includes a scanning or camera feature that enables the mobile phone to electronically read the content of the identifier 144, which identifies the installed motor to an information model service 154. The identifier 146 of the replacement motor is then scanned or photographed to determine the identity of the replacement motor. Other types of readers to determine the content of the identifier are also contemplated.

The information model service 154 includes a data log, for instance, located in the memory 128, which has the identity information of all installed pieces of equipment and the location of each installed piece of equipment. Upon identification of the installed motor, the location information of the installed motor is accessed from the information model service 154 and is used to update the location information of the replacement motor. In addition, the location portion of the data log for the installed and now replaced motor is replaced with an entry to indicate that the replaced motor is one of: "replaced" or "being repaired". The service client 152 updates the information model service 154 to include the location of the replacement motor.

Figure 3:
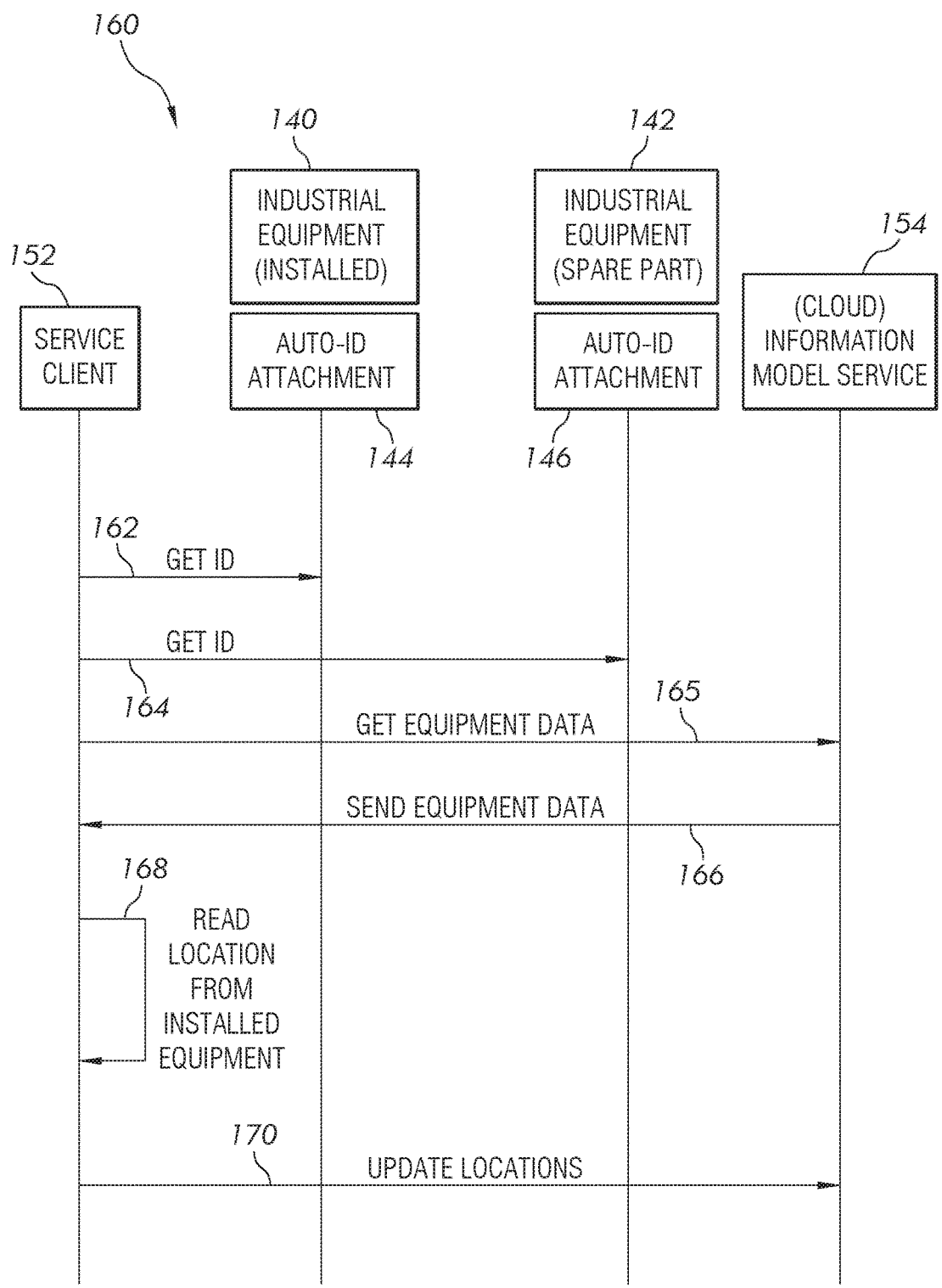
FIG. 3 is a block diagram of a process of detecting a defective device and identifying a replacement device to replace the defective device.

FIG. 3 is a block diagram of a process 160 of detecting a defective device and identifying a replacement device to replace the defective device. The process 160 includes the use of the service client 152, automatic identifiers located on a piece of equipment, and the information model service 154, which in this embodiment is located at the server 124 located in the "cloud". The process 160 begins with an operation 162, which includes identifying the installed equipment 140 by accessing the information located on the identifier (ID) attachment 144. At the same time, before, or after operation 162, the service client 152, identifies at operation 164, the replacement equipment 146 by accessing the identify information located on the identifier attachment 146.

After either one of the operations 162 or 164, the identifiers 144 and 146 are used to access equipment data from the information model service 154 at operation 165. While the information available through the information model 154 is identified as being located at the "cloud", other locations of the service model are contemplated. The accessed equipment data includes the identity and location of the installed equipment 140, which is then transmitted or made accessible to the service client 152 at operation 166. The location information of the installed equipment 140 is now available at the service client 152 at operation 168.

Once the information is located at, or is accessible to the service client 152, the location information is made available to a user of the mobile device 150 at a user interface (not shown). The user determines whether the location information is accurate for the replacement device and confirms that the location information is correct. The user interface in different embodiments includes, but is not limited to, an icon which when pressed or selected confirms the location information of the replacement device. Once confirmed, the location information of the replacement device is modified in the information model service 154 to indicate the current location of the device at operation 170.

The service client 152, that combines physical evidence about the identity (automatic identification) of physical equipment with communication with the information model service 154 and updates the information model located there or in another memory based on: (1) equipment identify; (2) location; and (3) the current version of the information model. By providing updates regarding equipment identity and location, efficient and timely updates of information model is made which also improves data quality.

The service client application 152 is configured to be operable with the mobile device, wherein the service client application provides for the display of information on a user interface of the mobile device. The mobile service application 152 is configured to display a list of the plurality of devices in the industrial system, a location identifier for each of the plurality of devices, and a replacement icon selectable to identify the device having the electrically identifiable tag as a replacement device for one of the plurality of devices in the list.

In another embodiment, the information model 154 is further configured to maintain a record of a replaced device, should the replaced device be repaired. In this embodiment, the replaced device is identified as a "device under repair" in the data log. Once repaired, the repaired device can be reinstalled in the industrial system for further use. The information model, therefore, tracks devices throughout an operation lifetime of the device, including any repair events and locations. In this way, the data log provides a device history of operation, location, maintenance, repair and use during a lifetime of the device. Such information is useful in both determining a device capability, a device's applicability to a particular industrial system or location within the system, and the overall operation of a system using such a device.

It shall be appreciated that a number of variations and modifications to process 160 is contemplated including, for example, the omission of one or more aspects of process 160, or the addition of further conditionals and operations and/or the reorganization or separation of operations and conditionals into separate processes.

It is contemplated that the various aspects, features, processes, and operations from the various embodiments may be used in any of the other embodiments unless expressly stated to the contrary. Certain illustrated operations may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to", "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A method of monitoring operating conditions of an industrial installation system including a plurality of devices, the method comprising:
   providing each of the plurality of devices with a transceiver;
   wirelessly coupling the plurality of devices to a wireless gateway using the transceivers of each of the plurality of devices, wherein the wireless gateway provides communication for each of the plurality of devices to a server via a network;
   monitoring one of the plurality of devices with a sensor configured to determine an operating state of the monitored device;
   transmitting the operating state of each of the plurality of devices to the server via the gateway;
   identifying the monitored device as a defective device needing replacement;
   electronically determining identity information of the defective device;
   electronically determining identity information of a replacement device by reading the identity information from an electronically identifiable tag associated with the replacement device using a reader of a mobile device;
   storing the determined identity information of the replacement device in a memory;
   determining location information of the defective device; and
   associating the location information of the defective device with the replacement device in a memory.

2. The method of claim 1 further comprising receiving the determined location information at a server.

3. The method of claim 2 further comprising storing the identify information of the defective device in the memory during a repair of the device.

4. The method of claim 3 further comprising identifying the defective device as a repaired device in the memory once repaired.

5. The method of claim 4 further comprising obtaining identity information of the repaired device from the memory.

6. The method of claim 5 further comprising determining location information of the repaired device from the memory.

7. The method of claim 6 further comprising storing the determined location information of the replacement device in the memory.

8. An industrial equipment system comprising:
a plurality of devices, wherein each device includes an electrically identifiable tag having information to uniquely identify the device with which the tag is associated; and a transceiver;
a wireless gateway wirelessly coupled to each of the plurality of devices using the transceivers of each of the plurality of devices, wherein the wireless gateway provides communication for each of the plurality of devices;
a microprocessor-based industrial equipment management system in operative communication with the plurality of devices, each of the plurality of devices being located remotely from the industrial equipment management system, wherein the microprocessor-based industrial equipment management system includes a controller and a memory configured to store program instructions, the controller configured to execute the stored program instructions to:
monitor an operating state of each of the plurality of device;
electronically determine identity information of a defective device of one of the plurality of devices;
electronically determine identity information of a replacement device adapted to replace the defective one of the plurality of devices;
store the identity information of the replacement device in the memory;
determine location information of the defective device; and
associate the determined location information of the defective device with the replacement device in the memory.

9. The industrial equipment system of claim 8 wherein each of the plurality of devices includes a sensor associated configured to determine the operating state of each of the plurality of devices.

10. The industrial equipment system of claim 9 wherein the controller is configured to execute stored program instructions to store the monitored operating state of each of the plurality of devices over a period of time and to determine whether the stored monitored operating state of any one of the plurality of devices indicates that the device is one of being the defective device.

11. The industrial equipment system of claim 10 wherein the controller is configured to execute the stored program instructions to provide an indicator identifying which of the plurality of devices is a defective device.

12. The industrial equipment system of claim 11 wherein the controller is configured to execute stored program instructions to identify a replacement device as a defective device that has been repaired.

13. An industrial equipment system, comprising:
a plurality of devices wherein each device includes an electrically identifiable tag having information to uniquely identify each of the plurality of devices, a sensor adapted to provide an operating state of the device, and a transceiver;
a wireless gateway wirelessly coupled to the plurality of devices using the transceivers of each of the plurality of devices, wherein the wireless gateway provides communication for each of the plurality of devices;
a mobile device having a reader adapted to determine the content of the electrically identifiable tag and a transmitter adapted to transmit the determined content of the electrically identifiable tag; and
a microprocessor-based industrial equipment management system in operative communication with the sensors of each of the plurality of devices via the wireless gateway and with the transmitter, each of the plurality of devices being located remotely from the industrial equipment management system, wherein the microprocessor-based industrial equipment management system includes a controller and a memory operatively connected to the controller and configured to store the content of the electrically identifiable tag and to store a location identifier of each of plurality of devices.

14. The industrial equipment system of claim 13 wherein the memory is configured to store the operating state of each of the plurality of devices and to associate the stored operating state of each of the plurality of devices with the information of the electrically identifiable tag.

15. The industrial equipment system of claim 14 further comprising a wireless receiver operatively connected to the controller wherein the wireless receiver is adapted to receive the content of the electrically identifiable tag.

16. The industrial equipment system of claim 15 wherein the controller is configured to store and associate the received content of the electrically identifiable tag in the memory with a location identifier.

17. The industrial equipment system of claim 16 further comprising a service client application configured to be operable with the mobile device, wherein the service client application provides for the display of information on a user interface of the mobile device.

18. The industrial equipment system of claim 17 wherein the mobile service application displays list of the plurality of devices, a location identifier for each of the plurality of devices, and a replacement icon selectable to identify the device having the electrically identifiable tag as a replacement device for one of the plurality of devices in the list.

* * * * *